(No Model.)
W. N. WHITELEY & W. BAYLEY.
DEVICE FOR ATTACHING WHEELS TO SHAFTS.
No. 392,480. Patented Nov. 6, 1888.
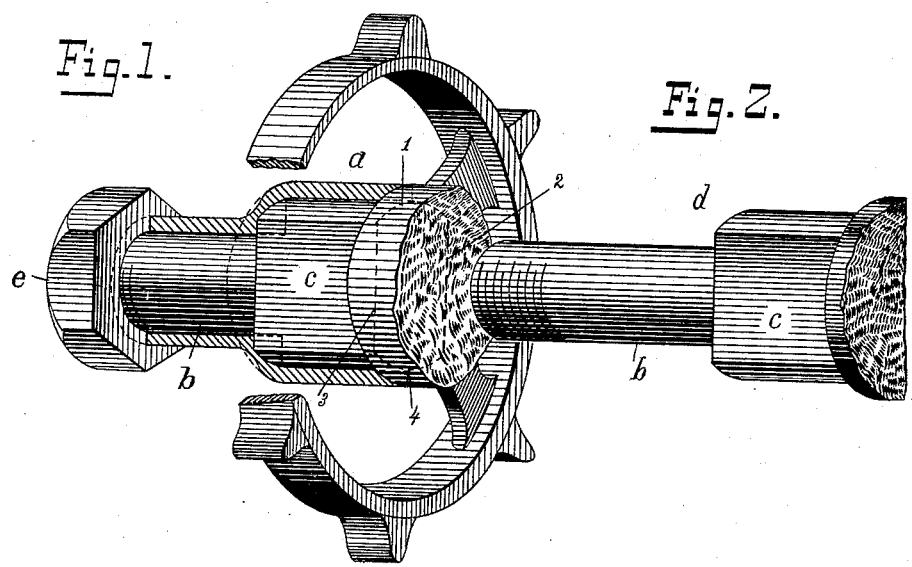
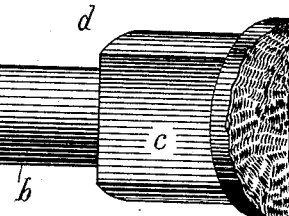
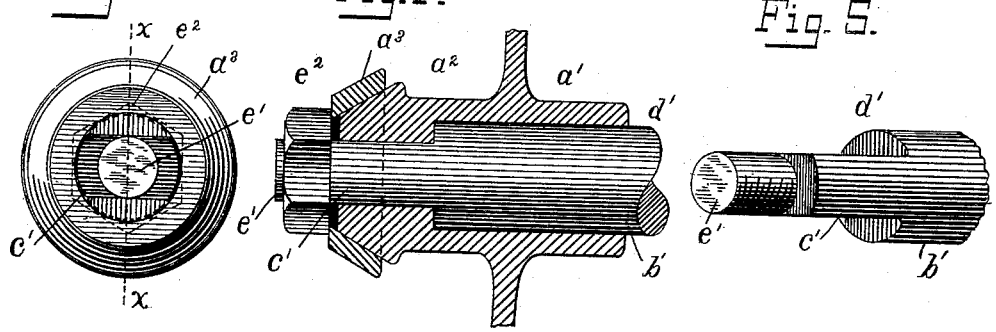
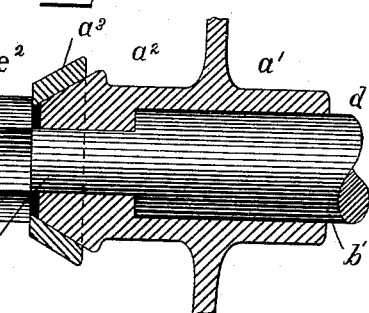
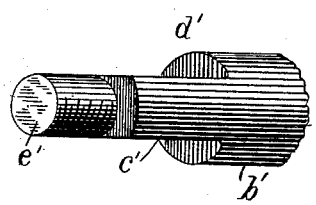
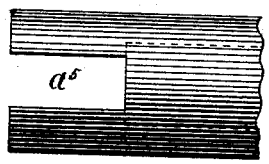
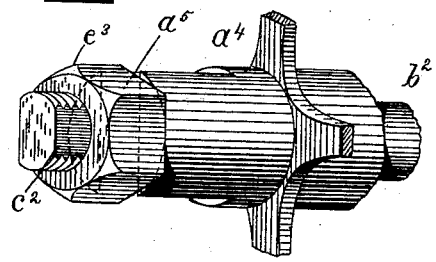
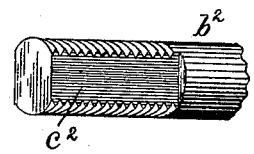
Witnesses:
Sue J. Houck.
William F. Bevitt.
Inventors:
William N. Whitely
William Bayley

UNITED STATES PATENT OFFICE.

WILLIAM N. WHITELEY AND WILLIAM BAYLEY, OF SPRINGFIELD, OHIO.

DEVICE FOR ATTACHING WHEELS TO SHAFTS.

SPECIFICATION forming part of Letters Patent No. 392,480, dated November 6, 1888.

Application filed February 9, 1888. Serial No. 263,515. (No model.)

*To all whom it may concern:*

Be it known that we, WILLIAM N. WHITELEY and WILLIAM BAYLEY, citizens of the United States, residing at Springfield, in the county of Clark and State of Ohio, have invented Improvements in Devices for Attaching Wheels to Shafts, of which the following description will enable any person skilled in the art to construct and use the same, reference being had to the accompanying drawings, forming a part of this specification.

Our invention relates to wheel-fastenings for securing wheels to shafts that rotate with the shaft, and is in the nature of improvements upon the various means used to secure wheels to shafts.

Our invention consists in a shaft having a part of it left round and a part of the wheel-hub fitted thereon, another portion of the shaft flattened, and a corresponding part of the hub fitted thereto. That part may be made square; but if it is the square must be within the circle forming the round. We prefer to flatten two sides, the hub being constructed to fit thereon, the round part of the shaft controlling the true running and the flattened part preventing the turning of the wheel upon the shaft without the use of key or pin.

Our invention further consists in the hub of the wheel being fitted to the round and to the flattened parts of the shaft, in combination with a conical hub end and a corresponding conical washer and screw-nut, either made separate or combined in one, for the purpose of securing the wheel to the shaft.

It further consists in the shaft being round with a thread cut upon the end and having one or more sides flattened, each part fitting in the hub of the wheel prepared to receive it, the round part to compel the true running of the wheel and the flattened sides to cause wheel and shaft to rotate together.

Referring to the drawings, Figure 1 is a perspective view of a wheel with the hub in section. Fig. 2 is a perspective view of the shaft withdrawn. Fig. 3 is an end elevation of the hub having a conical end, with the nut shown in dotted lines. Fig. 4 is a sectional view of the hub on the line $x\,x$, with the nut and shaft in elevation. Fig. 5 is a view of the shaft withdrawn from the hub and its end turned to better show its round portion and flattened sides. Fig. 6 is a plan view of a part of the hub, showing the flat portion adapted to receive the corresponding part of the shaft, the dotted lines indicating the round part of the shaft. Fig. 7 is a view of the hub partially turned. Fig. 8 is a similar view of the shaft withdrawn from the hub, showing its round and flat parts.

Like letters of reference indicate like parts in the several views.

The hub $a$ is constructed round at one end, and an oblong or flattened opening, as shown by the dotted lines 1, 2, 3, and 4, (see Fig. 1,) at the other end, which corresponds to the round part $b$ and flat part $c$ of the shaft $d$, the round part $b$ insuring the true running and the flat portion $c$ preventing the wheel from turning. The wheel is secured to the shaft by the nut $e$, and thus prevented from coming off.

Figs. 3, 4, and 5 represent a modification of our invention. In this case the hub $a'$ is provided with a conical end, $a^2$, and a corresponding washer, $a^3$, which serves to strengthen the end of the hub. The hub is adapted to receive the round part $b'$ and flat part $c'$ of the shaft $d'$. The projecting part of the shaft is turned down to a diameter corresponding to the thickness of the flat part, as shown at $c'$, which is threaded to receive the screw-nut $e^2$, thus preventing the wheel from coming off, the round part of the shaft fitting into the hub governing the true running and the flat part preventing the turning of the wheel on the shaft.

A third modification is illustrated by Figs. 6, 7, and 8. In this arrangement the hub $a^4$ is provided with a slot, $a^5$, cut through the end of the hub and less in width than the diameter of the shaft, the round part $b^2$ corresponding to the bore of the hub and the flat portion $c^2$ fitting into its place in the hub. The shaft $d^2$ has a screw-thread to receive the nut $e^3$, which secures the wheel to the shaft.

Having fully described our invention, what we desire to secure by Letters Patent is—

1. The combination of the shaft having a round portion and a flat portion at the side of said round portion, as described, and the wheel provided with a hub having corresponding round and flat portions, the round part of the shaft controlling the true running of the wheel and the flattened part preventing the wheel from turning on the shaft and securing it thereto without the use of key or pin.

2. The combination of the shaft having a round portion and a flat portion at one side of the said round portion, as described, and the wheel provided with a hub having corresponding round and flat portions, said hub having also a conical end and the shaft being provided with a corresponding clamping part, substantially as and for the purpose set forth.

WILLIAM N. WHITELEY.
WILLIAM BAYLEY.

Witnesses:
SOL. J. HOUCK,
WILLIAM F. BEVITT,